United States Patent
Liu et al.

(10) Patent No.: US 11,337,112 B2
(45) Date of Patent: May 17, 2022

(54) METHODS AND DEVICES FOR LOAD BALANCING ACROSS BAND-WIDTH PARTS

(71) Applicant: Telefonaktiebolaget LM Ericsson (publ), Stockholm (SE)

(72) Inventors: Jinhua Liu, Beijing (CN); Rui Fan, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/763,910

(22) PCT Filed: Nov. 15, 2018

(86) PCT No.: PCT/CN2018/115679
§ 371 (c)(1),
(2) Date: May 13, 2020

(87) PCT Pub. No.: WO2019/096213
PCT Pub. Date: May 23, 2019

(65) Prior Publication Data
US 2021/0176664 A1    Jun. 10, 2021

(30) Foreign Application Priority Data
Nov. 15, 2017    (WO) ............... PCT/CN2017/111149

(51) Int. Cl.
*H04W 28/08* (2009.01)
*H04W 72/08* (2009.01)

(52) U.S. Cl.
CPC ..... *H04W 28/085* (2013.01); *H04W 28/0967* (2020.05); *H04W 72/085* (2013.01)

(58) Field of Classification Search
CPC ............. H04W 28/085; H04W 72/085; H04W 28/0967; H04W 74/0833; H04W 72/042;
(Continued)

(56) References Cited

U.S. PATENT DOCUMENTS

| | | | | |
|---|---|---|---|---|
| 2016/0192370 A1* | 6/2016 | Chan | ..................... | H04W 76/14 370/329 |
| 2019/0037586 A1* | 1/2019 | Park | ..................... | H04L 1/0031 |

(Continued)

FOREIGN PATENT DOCUMENTS

| | | |
|---|---|---|
| CN | 101064634 A | 10/2007 |
| CN | 101222759 A | 7/2008 |

(Continued)

OTHER PUBLICATIONS

English translation of WO-2011018025-A1 (Year: 2011).*
Definition of "randomly" from google search (Year: 2021).*
International Search Report and Written Opinion issued in International Application No. PCT/CN2018/115679 dated Feb. 11, 2019 (9 pages).
(Continued)

*Primary Examiner* — Jung Liu
(74) *Attorney, Agent, or Firm* — Rothwell, Figg, Ernst & Manbeck, P.C.

(57) ABSTRACT

The present disclosure provides a method (200) in a terminal device for load balancing across Band-Width Parts, BWPs, in a carrier. The method (200) includes: determining (210) a set of random access capable BWPs in the carrier; and selecting (220) a camping BWP for the terminal device randomly from the set of random access capable BWPs.

11 Claims, 10 Drawing Sheets

(58) Field of Classification Search
CPC . H04W 74/006; H04W 72/048; H04W 24/08; H04W 72/0413; H04W 24/00; H04W 28/20; H04W 56/0045; H04W 74/085; H04W 72/0493; H04W 72/0453; H04W 56/001; H04W 48/10; H04L 5/0053; H04L 5/0007; H04L 5/001; H04L 5/0048; H04L 27/2602; H04L 5/0064; H04L 5/0094; H04L 5/0098; H04L 5/0057; H04L 5/0092; H04L 27/2607; H04L 5/0091; H04L 5/0044; H04B 7/0617; H04B 7/02; H04B 7/0452
See application file for complete search history.

(56) References Cited

U.S. PATENT DOCUMENTS

2020/0296656 A1* 9/2020 Amuru ............ H04L 1/1896
2020/0344761 A1* 10/2020 Amuru ............ H04L 5/0007

FOREIGN PATENT DOCUMENTS

WO  WO-2011018025 A1 *  2/2011  ............ H04W 68/02
WO  2016/044724 A2  3/2016
WO  WO-2016182531 A1 *  11/2016  ...... H04W 36/00835

OTHER PUBLICATIONS

ZTE Corporation, "Initial discussion on the impacts of BWP on RAN2", 3GPP TSG-RAN WG2 Meeting #99bis, R2-1711640, Prague, Czech Republic, Oct. 9-13, 2017 (5 pages).

Ericsson, "On Bandwidth Parts and Multiple SSBs" 3GPP TSG-RAN WG2 #99bis, Tdoc R2-1711822, Prague, Czech Republic, Oct. 9-13, 2017 (6 pages).

Huawei et al., "User plane impacts for Bandwidth Parts", 3GPP TSG-RAN WG2 #99bis, R2-1710217, Prague, CZ, Oct. 9-13, 2017 (6 pages).

LG Electronics, "Discussion on carrier aggregation and bandwidth parts", 3GPP TSG RAN WG1 Meeting NR#3, R1-1715892, Nagoya, Japan, Sep. 18-21, 2017 (12 pages).

* cited by examiner

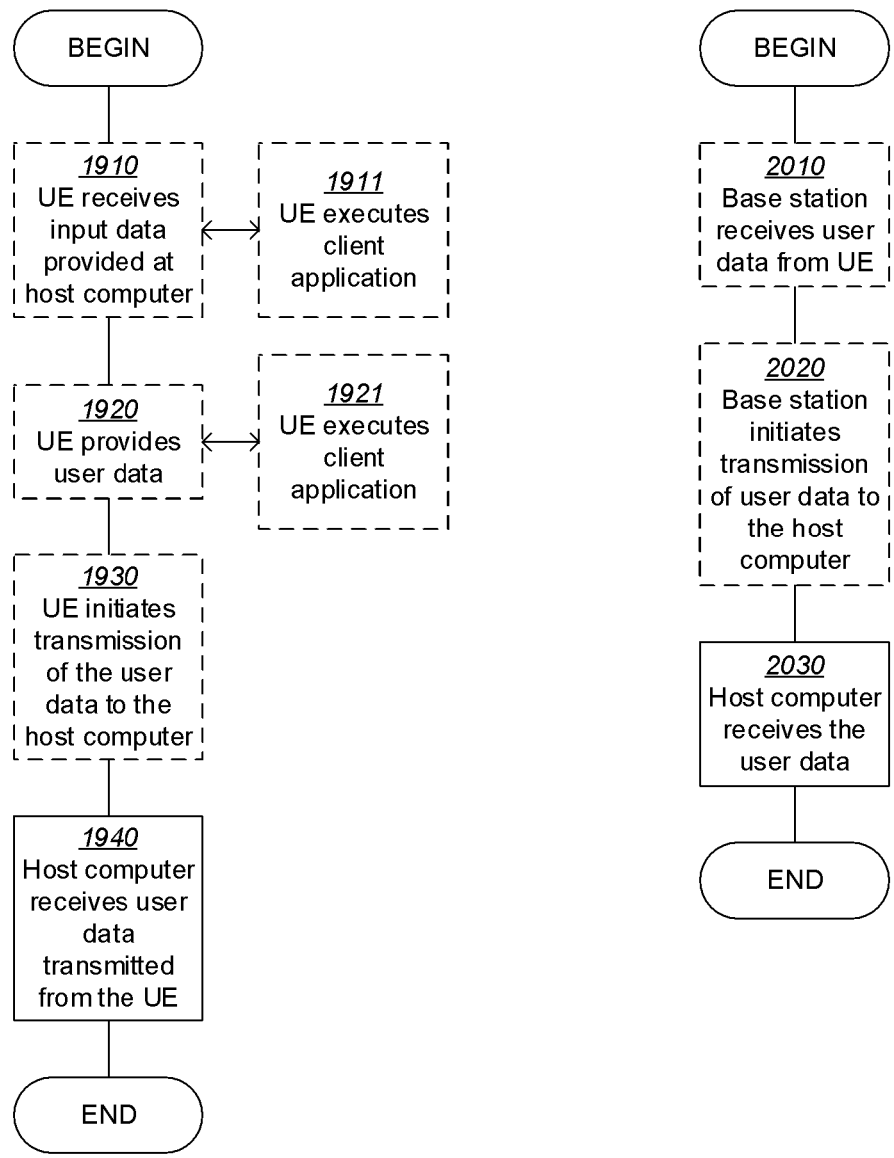

METHODS AND DEVICES FOR LOAD BALANCING ACROSS BAND-WIDTH PARTS

CROSS REFERENCE TO RELATED APPLICATION(S)

This application is a 35 U.S.C. § 371 National Stage of International Patent Application No. PCT/CN2018/115679, filed Nov. 15, 2018, designating the United States and claiming priority to International Patent Application No. PCT/CN2017/111149, filed on Nov. 15, 2017. The above identified applications are incorporated by reference.

TECHNICAL FIELD

The present disclosure relates to wireless communications, and more particularly, to methods and devices for load balancing across Band-Width Parts (BWPs).

BACKGROUND

In New Radio (NR), there can be a huge carrier bandwidth for an NR carrier, e.g., up to 1 GHz, which is much wider than a carrier bandwidth of 20 MHz in Long Term Evolution (LTE). A concept of Band-Width Part (BWP) has been introduced in NR, where a fraction of the carrier bandwidth can be configured for a terminal device, such that the terminal device would not have to monitor the entire carrier bandwidth.

Some BWPs may have full functionalities like an LTE cell. In such BWPs, there are transmissions of Synchronization Signal Block (SSB) and at least System Information Broadcast Type 1 (SIB1), with associated Physical Random Access Channel (PRACH) configuration in SIB1. These BWPs can be referred to as random access capable BWPs hereinafter.

Other BWPs may not have full cell functionalities but for traffic offloading only. For instance, there may not be PRACH configuration in these BWPs.

Besides, different BWPs may be configured with different numerologies/slot durations for various Quality of Service (QoS) requirements of a terminal device, e.g., in terms of delay, reliability and data rate.

FIG. 1 shows an example of an NR carrier including four BWPs, BWP0, BWP1, BWP2 and BWP3. As shown, BWP0, BWP1 and BWP3 are configured with resources for SSB and SIB1 transmissions, while BWP2 is configured with resources for SSB transmissions only. That is, BWP0, BWP1 and BWP3 are random access capable BWPs, whereas BWP2 is for traffic offloading only.

SUMMARY

It is an object of the present disclosure to provide methods and devices for load balancing across BWPs.

According to a first aspect of the present disclosure, a method in a terminal device for load balancing across Band-Width Parts (BWPs) in a carrier is provided. The method includes: determining a set of random access capable BWPs in the carrier; and selecting a camping BWP for the terminal device randomly from the set of random access capable BWPs.

In an embodiment, the operation of determining may include receiving information on the set of random access capable BWPs via a system broadcast.

In an embodiment, the operation of determining may include searching an entire bandwidth of the carrier for the set of random access capable BWPs.

In an embodiment, the operation of selecting may include selecting the camping BWP based on an Area-Radio Network Temporary Identifier (A-RNTI), an International Mobile Subscriber Identification (IMSI), or Service Architecture Evolution-Temporary Mobile Subscriber Identity (S-TMSI).

In an embodiment, the camping BWP may be selected in such a way that a BWP having a first radio quality is prioritized over a BWP having a second radio quality lower than the first radio quality.

In an embodiment, the camping BWP may be selected in such a way that a BWP having a first slot duration is prioritized over a BWP having a second slot duration shorter than the first slot duration, when both BWPs have radio qualities lower than a radio quality threshold.

In an embodiment, the operation of selecting may be performed further based on a delay requirement, and the camping BWP is selected in such a way that a BWP having a first slot duration is prioritized over a BWP having a second slot duration longer than the first slot duration.

In an embodiment, the method may further include receiving, from a network device, an instruction to camp on another BWP; and camping on the other BWP in response to the instruction.

In an embodiment, the method may further include receiving, from a network device, an indication of load levels of one or more random access capable BWPs in the carrier; reselecting one of the one or more random access capable BWPs to camp on based on the load levels.

In an embodiment, the method may further include receiving, from a network device, an indication of BWP-specific offsets of one or more random access capable BWPs in the carrier; reselecting one of the one or more random access capable BWPs to camp on while applying the BWP-specific offsets to signal power thresholds of the respective one or more random access capable BWPs.

In an embodiment, the terminal device may be in an idle or inactive state.

According to a second aspect of the present disclosure, a method in a terminal device for load balancing across Band-Width Parts (BWPs) in a carrier is provided. The method includes: searching the carrier for a random access capable BWP; and camping on the random access capable BWP. The searching is randomized in such a way that the carrier is searched with a random start position and/or a random direction.

In an embodiment, the operation of searching may include selecting a searching scheme randomly from a plurality of predefined searching schemes having respectively different start positions and/or random directions.

In an embodiment, the method may further include receiving, from a network device, an instruction to camp on another BWP; and camping on the other BWP in response to the instruction.

In an embodiment, the method may further include receiving, from a network device, an indication of load levels of one or more random access capable BWPs in the carrier; reselecting one of the one or more random access capable BWPs to camp on based on the load levels.

In an embodiment, the method may further include receiving, from a network device, an indication of BWP-specific offsets of one or more random access capable BWPs in the carrier; reselecting one of the one or more random access capable BWPs to camp on while applying the BWP-specific offsets to signal power thresholds of the respective one or more random access capable BWPs.

In an embodiment, the terminal device may be in an idle or inactive state.

According to a third aspect of the present disclosure, a method in a terminal device for load balancing across Band-Width Parts (BWPs) in a carrier is provided. The terminal device is in an active state and camping on a BWP in the carrier. The method includes: receiving, from a network device, an instruction to camp on another BWP; and camping on the other BWP in response to the instruction.

In an embodiment, the instruction may be received when the terminal device is to transition to an idle or inactive state.

According to a fourth aspect of the present disclosure, a terminal device is provided. The terminal device includes a transceiver, a processor and a memory.

The memory includes instructions executable by the processor whereby the terminal device is operative to perform the method according to any of the above first, second and third aspects.

According to a fifth aspect of the present disclosure, a computer readable storage medium is provided. The computer readable storage medium has computer program instructions stored thereon. The computer program instructions, when executed by a processor in a terminal device, cause the terminal device to perform the method according to any of the above first, second and third aspects.

According to a sixth aspect of the present disclosure, a method in a network device for load balancing across Band-Width Parts (BWPs) in a carrier is provided. The method includes: determining a set of random access capable BWPs in the carrier; and transmitting information on the set of random access capable BWPs via a system broadcast.

In an embodiment, the terminal device may be in an idle or inactive state.

According to a seventh aspect of the present disclosure, a method in a network device for load balancing across Band-Width Parts (BWPs) in a carrier is provided. The method includes: determining to reallocate a terminal device camping on a BWP in the carrier to another BWP; and transmitting to the terminal device an instruction to camp on the other BWP.

In an embodiment, the other BWP may have the lowest load level among random access capable BWPs in the carrier.

In an embodiment, the terminal device may be in an idle or inactive state.

According to an eighth aspect of the present disclosure, a method in a network device for load balancing across Band-Width Parts (BWPs) in a carrier is provided.

The method includes: determining information facilitating BWP reselection at a terminal device; and transmitting the information to the terminal device.

In an embodiment, the information may include an indication of load levels of one or more random access capable BWPs in the carrier.

In an embodiment, the information may include an indication of BWP-specific offsets of one or more random access capable BWPs in the carrier, for use by the terminal device to apply to signal power thresholds of the respective one or more random access capable BWPs in the BWP reselection.

In an embodiment, the terminal device may be in an idle or inactive state.

According to a ninth aspect of the present disclosure, a method in a network device for load balancing across Band-Width Parts (BWPs) in a carrier is provided. The method includes: determining to reallocate a terminal device being in an active state and camping on a BWP in the carrier to another BWP; and transmitting to the terminal device an instruction to camp on the other BWP.

In an embodiment, the instruction may be transmitted when the terminal device is to transition to an idle or inactive state.

According to a tenth aspect of the present disclosure, a network device is provided. The network device includes a transceiver, a processor and a memory. The memory includes instructions executable by the processor whereby the network device is operative to perform the method according to any of the above sixth, seventh, eighth and ninth aspects.

According to an eleventh aspect of the present disclosure, computer readable storage medium is provided. The computer readable storage medium has computer program instructions stored thereon. The computer program instructions, when executed by a processor in a network device, cause the network device to perform the method according to any of the above sixth, seventh, eighth and ninth aspects.

With the embodiments of the present disclosure, camping BWPs of terminal devices can be randomized, thereby achieving a load balance across BWPs in a carrier.

BRIEF DESCRIPTION OF THE DRAWINGS

The above and other objects, features and advantages will be more apparent from the following description of embodiments with reference to the figures, in which:

FIGS. 17 to 20 are flowcharts illustrating methods implemented in a communication system including a host computer, a base station and a user equipment.

DETAILED DESCRIPTION

Figure 1:
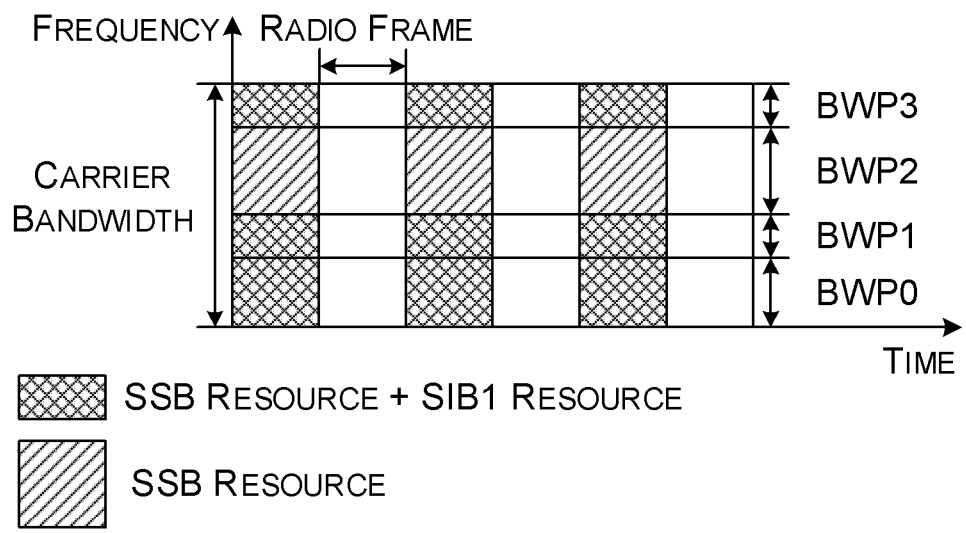
FIG. 1 is a schematic diagram showing an example of an NR carrier.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

When there are several random access capable BWPs in a carrier, a terminal device needs to determine one of the random access capable BWPs as its camping BWP and initiate a random access process. The inventors have realized that, without assisting information from the network side, the determination of the camping BWP by the terminal device may depend on the terminal device's behavior of camping BWP searching, which may cause imbalance in random access load among the BWPs when all terminal devices follow the same rule in camping BWP searching. For the carrier shown in FIG. 1 as an example, if all terminal devices search the carrier for their camping BWPs from low frequency to high frequency, they will all end up camping on the same BWP (i.e., BWP0). This is also the case when all terminal devices search the carrier for their camping BWPs starting from the center of the carrier bandwidth and end up camping on BWP1.

As those terminal devices camping on the same BWP, e.g., in an idle or inactive state, will initiate random access processes in that BWP, such imbalance would lead to random access overload, and thus data traffic congestions, in one particular BWP and inefficient use of radio resource in other BWPs. Moreover, while it is feasible to reallocate a terminal device to another BWP for traffic offloading when it is in an active (e.g., Radio Resource Control (RRC) Connected) state, for a small data transmission, it would be infeasible or inefficient to apply such traffic offloading due to delay and/or signaling overhead. Since there will be a huge amount of such small data transmissions in NR, there is a need for a solution to such imbalance.

Figure 2:
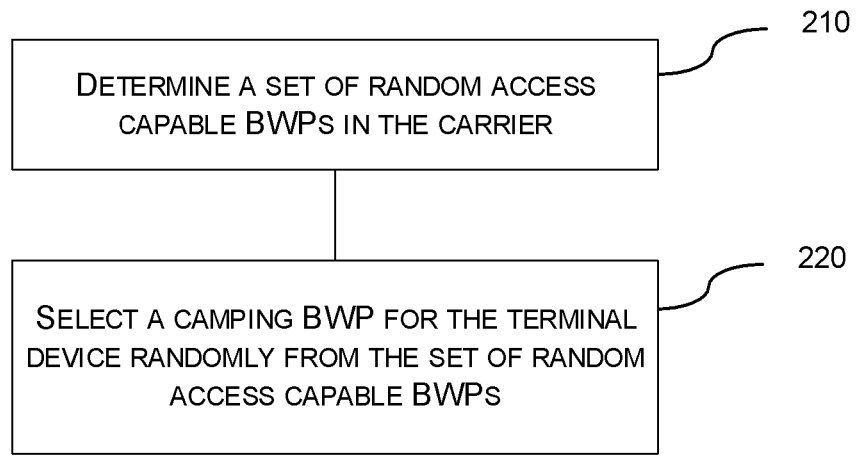
FIG. 2 is a flowchart illustrating a method in a terminal device for load balancing across BWPs according to an embodiment of the present disclosure.

FIG. 2 is a flowchart illustrating a method 200 for load balancing across BWPs in a carrier according to an embodiment of the present disclosure. The method 200 can be performed at a terminal device. The terminal device can be in an idle or inactive state.

At block 210, a set of random access capable BWPs in the carrier is determined.

In the block 210, the terminal device can receive information on the set of random access capable BWPs via a system broadcast. For example, the information may include information on SSB configuration and SIB1 configuration, e.g., time-frequency resources for SSB and SIB1 transmissions.

Alternatively, the terminal device can search an entire bandwidth of the carrier for the set of random access capable BWPs.

At block 220, a camping BWP for the terminal device is selected randomly from the set of random access capable BWPs.

In the block 220, the terminal device can select the camping BWP based on an Area-Radio Network Temporary Identifier (A-RNTI), an International Mobile Subscriber Identification (IMSI), or Service Architecture Evolution-Temporary Mobile Subscriber Identity (S-TMSI). In an example, the terminal device can assign indices 0, 1, . . . , N to the respective random access capable BWPs in the set determined in the block 210 and select the BWP having an index i according to:

$$i = \text{A-RNTI or IMSI or S-TMSI mod N}. \quad (1)$$

The random access capable BWPs in the set determined in the block 210 may have different numerologies and/or slot durations, which provide different coverage and/or delay-tolerance capabilities. When selecting the camping BWP in the block 220, the terminal device can also take radio qualities and/or slot durations into consideration, so as to meet different requirements. In an example, in the block 220, the camping BWP can be selected in such a way that a BWP having a first radio quality is prioritized over a BWP having a second radio quality lower than the first radio quality. For example, a subset of the random access capable BWPs having radio qualities higher than a predetermined threshold can be given a priority in selection of the camping BWP in the block 220. Alternatively, the camping BWP can be selected in such a way that a BWP having a first slot duration is prioritized over a BWP having a second slot duration shorter than the first slot duration, when both BWPs have radio qualities lower than a radio quality threshold. In other words, in order to provide coverage to a terminal device having a low radio quality, a BWP having a long slot duration can be given a priority in selection of the camping BWP in the block 220. Alternatively, the selection in the block 220 can be performed further based on a delay requirement. In this case, the camping BWP can be selected in such a way that a BWP having a first slot duration is prioritized over a BWP having a second slot duration longer than the first slot duration. In other words, in order to meet a requirement of a short delay, a BWP having a short slot duration can be given a priority in selection of the camping BWP in the block 220.

In an example, the terminal device can receive, from a network device, an instruction to camp on another BWP, e.g., via a paging message, a system message, a Physical Downlink Control Channel (PDCCH) order or a Medium Access Control (MAC) Control Element (CE). Then, the terminal device can camp on the other BWP in response to the instruction.

Alternatively, the terminal device can receive, from a network device, an indication of load levels of one or more random access capable BWPs in the carrier. The terminal device can reselect one of the one or more random access capable BWPs to camp on based on the load levels. For example, the terminal device can reselect one of the one or more random access capable BWPs that has the lowest load level to camp on.

Alternatively, the terminal device can receive, from a network device, an indication of BWP-specific offsets of one or more random access capable BWPs in the carrier. The terminal device can reselect one of the one or more random access capable BWPs to camp on while applying the BWP-specific offsets to signal power thresholds of the respective one or more random access capable BWPs. The BWP-specific offsets can be dependent on load levels of the respective BWPs. For example, for a BWP having a low load level, the BWP-specific offset can be applied such that the signal power threshold for the BWP is lowered and thus the BWP will be more likely to be selected by the terminal device.

Figure 3:
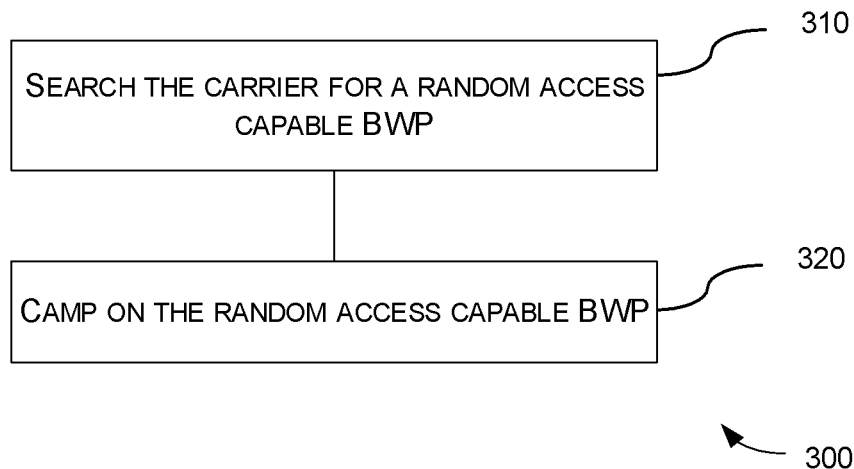
FIG. 3 is a flowchart illustrating a method in a terminal device for load balancing across BWPs according to another embodiment of the present disclosure.

FIG. 3 is a flowchart illustrating a method 300 for load balancing across BWPs in a carrier according to another embodiment of the present disclosure. The method 300 can be performed at a terminal device. The terminal device can be in an idle or inactive state.

At block 310, the carrier is searched for a random access capable BWP. The searching is randomized in such a way that the carrier is searched with a random start position and/or a random direction (e.g., from low to high frequency or from high to low frequency). For example, the terminal device can select a searching scheme randomly from a plurality of predefined searching schemes having respectively different start positions and/or random directions.

At block 320, the terminal device camps on the random access capable BWP.

As in the method 200, the terminal device can receive, from a network device, an instruction to camp on another BWP. Then, the terminal device can camp on the other BWP in response to the instruction.

Alternatively, the terminal device can receive, from a network device, an indication of load levels of one or more random access capable BWPs in the carrier. The terminal device can reselect one of the one or more random access capable BWPs to camp on based on the load levels.

Alternatively, the terminal device can receive, from a network device, an indication of BWP-specific offsets of one or more random access capable BWPs in the carrier. The terminal device can reselect one of the one or more random access capable BWPs to camp on while applying the BWP-specific offsets to signal power thresholds of the respective one or more random access capable BWPs.

Figure 4:
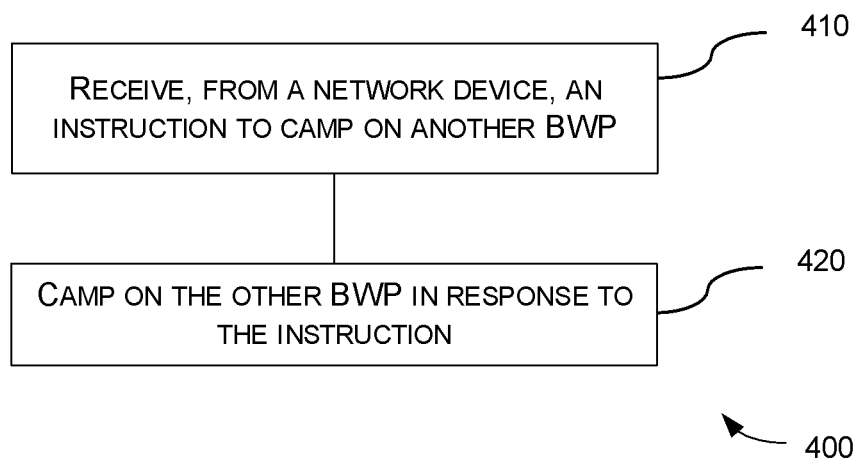
FIG. 4 is a flowchart illustrating a method in a terminal device for load balancing across BWPs according to yet another embodiment of the present disclosure.

FIG. 4 is a flowchart illustrating a method 400 for load balancing across BWPs in a carrier according to yet another embodiment of the present disclosure. The method 400 can be performed at a terminal device. The terminal device can be in an active state and camp on a BWP in the carrier.

At block 410, an instruction to camp on another BWP is received from a network device. In an example, the instruction can be received when the terminal device is to transition to an idle or inactive state. The instruction may be explicit or implicit (e.g., by means of a load level indication allowing the terminal device to camp on a BWP having a low load level).

At block 420, the terminal device camps on the other BWP in response to the instruction.

Figure 5:
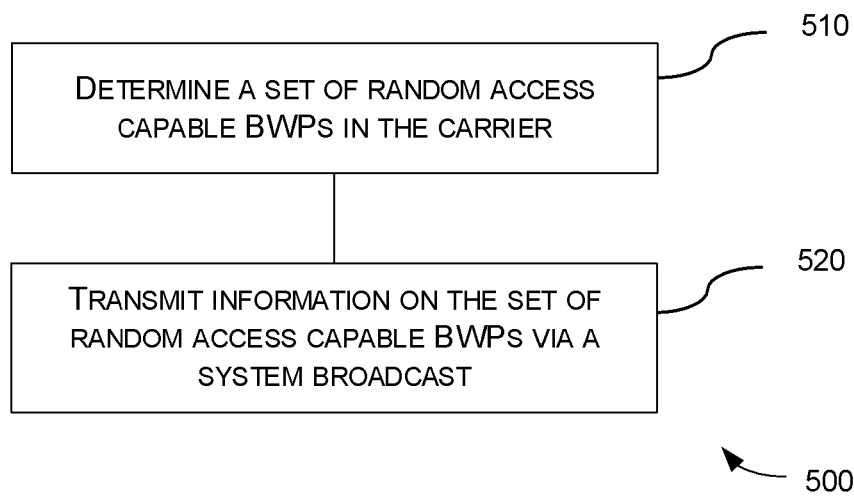
FIG. 5 is a flowchart illustrating a method in a network device for load balancing across BWPs according to an embodiment of the present disclosure.

FIG. 5 is a flowchart illustrating a method 500 for load balancing across BWPs in a carrier according to an embodiment of the present disclosure. The method 500 can be performed at a network device.

At block 510, a set of random access capable BWPs in the carrier is determined.

At block 520, information on the set of random access capable BWPs is transmitted via a system broadcast. As discussed above in connection with the method 200, the information may include information on SSB configuration and SIB1 configuration, e.g., time-frequency resources for SSB and SIB1 transmissions. The information can facilitate selection of a camping BWP at a terminal device. The terminal device can be in an idle or inactive state.

Figure 6:
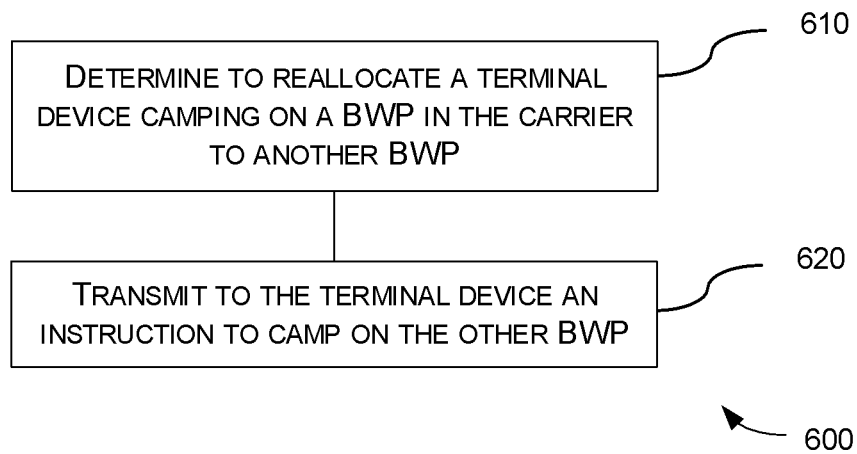
FIG. 6 is a flowchart illustrating a method in a network device for load balancing across BWPs according to another embodiment of the present disclosure.

FIG. 6 is a flowchart illustrating a method 600 for load balancing across BWPs in a carrier according to another embodiment of the present disclosure. The method 600 can be performed at a network device.

At block 610, the network device determines to reallocate a terminal device camping on a BWP in the carrier to another BWP.

At block 620, the network device transmits to the terminal device an instruction to camp on the other BWP. The instruction can be transmitted via a paging message, a system message, a Physical Downlink Control Channel (PDCCH) order or a Medium Access Control (MAC) Control Element (CE). The terminal device can be in an idle or inactive state.

In an example, the other BWP has the lowest load level among random access capable BWPs in the carrier.

Figure 7:
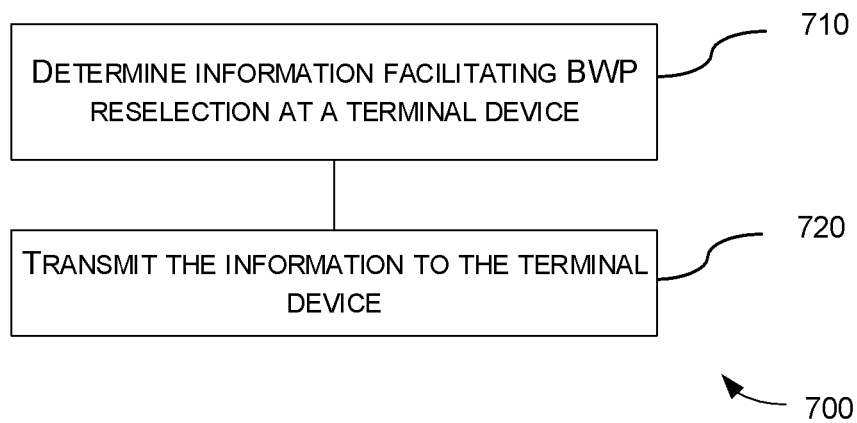
FIG. 7 is a flowchart illustrating a method in a network device for load balancing across BWPs according to yet another embodiment of the present disclosure.

FIG. 7 is a flowchart illustrating a method 700 for load balancing across BWPs in a carrier according to yet another embodiment of the present disclosure. The method 700 can be performed at a network device.

At block 710, information facilitating BWP reselection at a terminal device is determined.

At block 720, the information is transmitted to the terminal device. The terminal device can be in an idle or inactive state.

In an example, the information can include an indication of load levels of one or more random access capable BWPs in the carrier. As described above in connection with the method 200, the terminal device can reselect one of the one or more random access capable BWPs to camp on based on the load levels. For example, the terminal device can reselect one of the one or more random access capable BWPs that has the lowest load level to camp on.

Alternatively, the information can include an indication of BWP-specific offsets of one or more random access capable BWPs in the carrier, for use by the terminal device to apply to signal power thresholds of the respective one or more random access capable BWPs in the BWP reselection. As described above in connection with the method 200, the terminal device can reselect one of the one or more random access capable BWPs to camp on while applying the BWP-specific offsets to signal power thresholds of the respective one or more random access capable BWPs. The BWP-specific offsets can be dependent on load levels of the respective BWPs. For example, for a BWP having a low load level, the BWP-specific offset can be applied such that the signal power threshold for the BWP is lowered and thus the BWP will be more likely to be selected by the terminal device.

Figure 8:
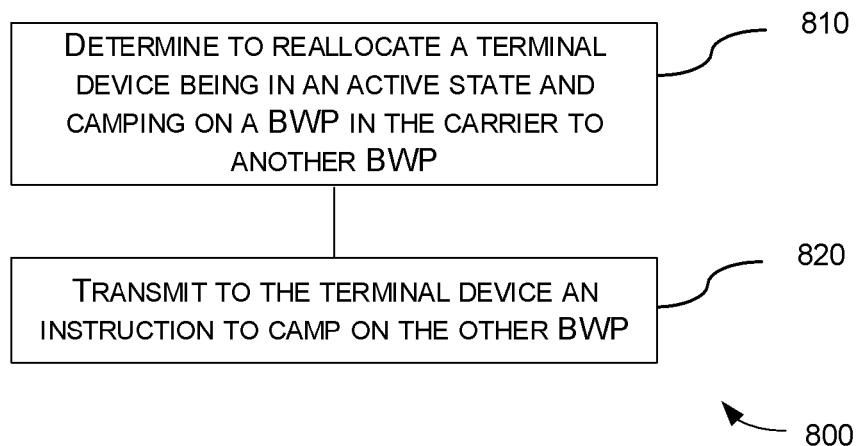
FIG. 8 is a flowchart illustrating a method in a network device for load balancing across BWPs according to a further embodiment of the present disclosure.

FIG. 8 is a flowchart illustrating a method 800 for load balancing across BWPs in a carrier according to a further embodiment of the present disclosure. The method 800 can be performed at a network device.

At block 810, the network device determines to reallocate a terminal device being in an active state and camping on a BWP in the carrier to another BWP.

At block 820, the network device transmits to the terminal device an instruction to camp on the other BWP.

In an example, the instruction can transmitted when the terminal device is to transition to an idle or inactive state. The instruction may be explicit or implicit (e.g., by means of a load level indication allowing the terminal device to camp on a BWP having a low load level).

Figure 9:
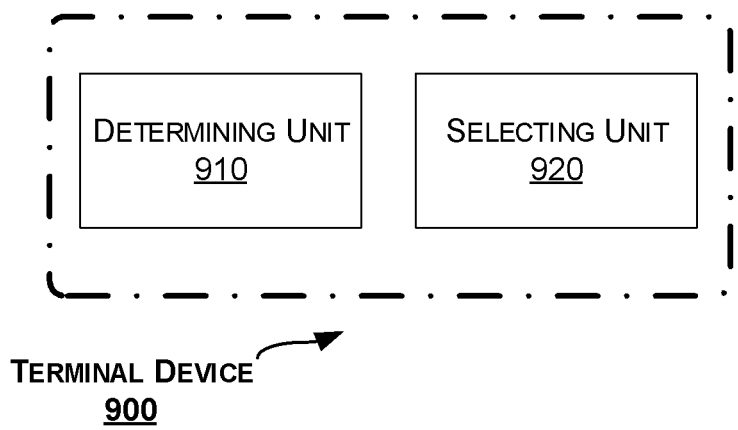
FIG. 9 is a block diagram of a terminal device according to an embodiment of the present disclosure.

Correspondingly to the method 200 as described above, a terminal device is provided. FIG. 9 is a block diagram of a terminal device 900 according to an embodiment of the present disclosure.

As shown in FIG. 9, the terminal device 900 includes a determining unit 910 configured to a set of random access capable BWPs in a carrier. The terminal device 900 further includes a selecting unit 920 configured to select a camping BWP for the terminal device randomly from the set of random access capable BWPs.

In an embodiment, the determining unit 910 can be configured to receive information on the set of random access capable BWPs via a system broadcast.

In an embodiment, the determining unit 910 can be configured to search an entire bandwidth of the carrier for the set of random access capable BWPs.

In an embodiment, the selecting unit 920 can be configured to select the camping BWP based on an Area-Radio Network Temporary Identifier, A-RNTI, an International Mobile Subscriber Identification, IMSI, or Service Architecture Evolution-Temporary Mobile Subscriber Identity, S-TMSI.

In an embodiment, the selecting unit 920 can be configured to select the camping BWP in such a way that a BWP having a first radio quality is prioritized over a BWP having a second radio quality lower than the first radio quality.

In an embodiment, the selecting unit 920 can be configured to select the camping BWP in such a way that a BWP having a first slot duration is prioritized over a BWP having a second slot duration shorter than the first slot duration, when both BWPs have radio qualities lower than a radio quality threshold.

In an embodiment, the selecting unit 920 can be configured to select the camping BWP further based on a delay requirement, and to select the camping BWP in such a way that a BWP having a first slot duration is prioritized over a BWP having a second slot duration longer than the first slot duration.

In an embodiment, the terminal device 900 can further include a receiving unit configured to receive, from a network device, an instruction to camp on another BWP. The terminal device 900 can further include a camping unit configured to camp on the other BWP in response to the instruction.

In an embodiment, the terminal device 900 can further include a receiving unit configured to receive, from a network device, an indication of load levels of one or more random access capable BWPs in the carrier. The terminal device 900 can further include a reselecting unit configured to reselect one of the one or more random access capable BWPs to camp on based on the load levels.

In an embodiment, the terminal device 900 can further include a receiving unit configured to receive, from a network device, an indication of BWP-specific offsets of one or more random access capable BWPs in the carrier. The terminal device 900 can further include a reselecting unit configured to reselect one of the one or more random access capable BWPs to camp on while applying the BWP-specific offsets to signal power thresholds of the respective one or more random access capable BWPs.

In an embodiment, the terminal device 900 can be in an idle or inactive state.

The determining unit 910 and the selecting unit 920 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 10:
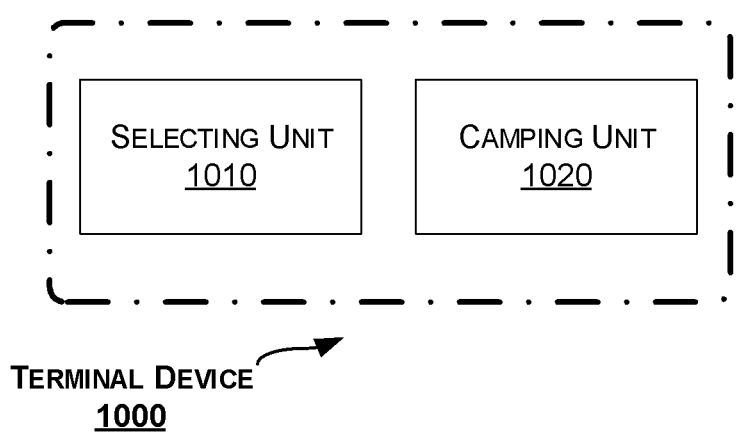
FIG. 10 is a block diagram of a terminal device according to another embodiment of the present disclosure.

Correspondingly to the method 300 as described above, a terminal device is provided. FIG. 10 is a block diagram of a terminal device 1000 according to an embodiment of the present disclosure.

As shown in FIG. 10, the terminal device 1000 includes a searching unit 1010 configured to search a carrier for a random access capable BWP. The terminal device 1000 further includes a camping unit 1020 configured to camp on the random access capable BWP. The searching is randomized in such a way that the carrier is searched with a random start position and/or a random direction.

In an embodiment, the searching unit 1010 is configured to select a searching scheme randomly from a plurality of predefined searching schemes having respectively different start positions and/or random directions.

In an embodiment, the terminal device 1000 can further include a receiving unit configured to receive, from a network device, an instruction to camp on another BWP. The camping unit 1020 is configured to camp on the other BWP in response to the instruction.

In an embodiment, the terminal device 1000 can further include a receiving unit configured to receive, from a network device, an indication of load levels of one or more random access capable BWPs in the carrier. The terminal device 1000 can further include a reselecting unit configured to reselect one of the one or more random access capable BWPs to camp on based on the load levels.

In an embodiment, the terminal device 1000 can further include a receiving unit configured to receive, from a network device, an indication of BWP-specific offsets of one or more random access capable BWPs in the carrier. The terminal device 1000 can further include a reselecting unit configured to reselect one of the one or more random access capable BWPs to camp on while applying the BWP-specific offsets to signal power thresholds of the respective one or more random access capable BWPs.

In an embodiment, the terminal device 1000 can be in an idle or inactive state.

The searching unit 1010 and the camping unit 1020 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 11:
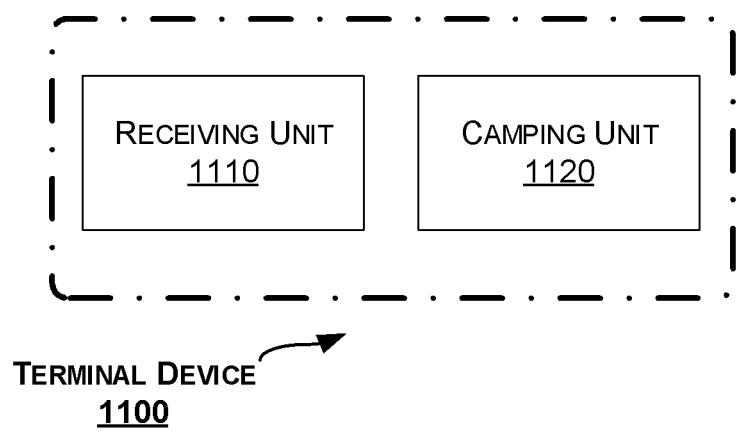
FIG. 11 is a block diagram of a terminal device according to yet another embodiment of the present disclosure.

Correspondingly to the method 400 as described above, a terminal device is provided. FIG. 11 is a block diagram of a terminal device 1100 according to an embodiment of the present disclosure. The terminal device 1100 is in an active state and camping on a BWP in a carrier.

As shown in FIG. 11, the terminal device 1100 includes a receiving unit 1110 configured to receive, from a network device, an instruction to camp on another BWP. The terminal device 1100 further includes a camping unit 1120 configured to camp on the other BWP in response to the instruction.

In an embodiment, the receiving unit 1110 is configured to receive the instruction when the terminal device is to transition to an idle or inactive state.

The receiving unit 1110 and the camping unit 1120 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 12:
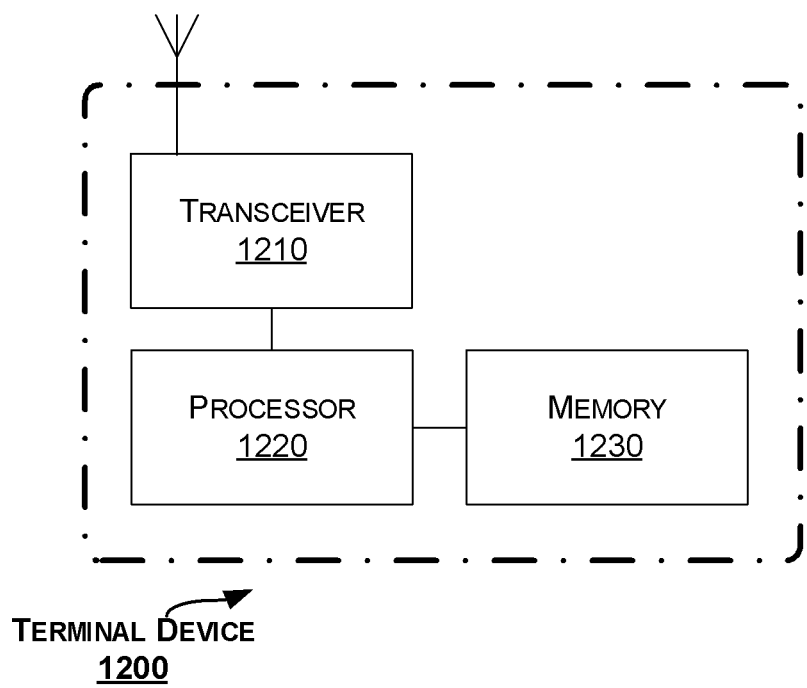
FIG. 12 is a block diagram of a terminal device according to a further embodiment of the present disclosure.

FIG. 12 is a block diagram of a terminal device 1200 according to a further embodiment of the present disclosure.

The terminal device 1200 includes a transceiver 1210, a processor 1220 and a memory 1230. The memory 1230 can contain instructions executable by the processor 1220 whereby the terminal device 1200 is operative to perform the actions, e.g., of the procedure described earlier in conjunction with FIG. 2. Particularly, the memory 1230 contains instructions executable by the processor 1220 whereby the terminal device 1200 is operative to: determine a set of random access capable BWPs in a carrier; and select a camping BWP for the terminal device randomly from the set of random access capable BWPs.

In an embodiment, the operation of determining includes: receiving information on the set of random access capable BWPs via a system broadcast.

In an embodiment, the operation of determining includes: searching an entire bandwidth of the carrier for the set of random access capable BWPs.

In an embodiment, the operation of selecting includes: selecting the camping BWP based on an Area-Radio Network Temporary Identifier (A-RNTI), an International Mobile Subscriber Identification (IMSI), or Service Architecture Evolution-Temporary Mobile Subscriber Identity (S-TMSI).

In an embodiment, the camping BWP is selected in such a way that a BWP having a first radio quality is prioritized over a BWP having a second radio quality lower than the first radio quality.

In an embodiment, the camping BWP is selected in such a way that a BWP having a first slot duration is prioritized over a BWP having a second slot duration shorter than the first slot duration, when both BWPs have radio qualities lower than a radio quality threshold.

In an embodiment, the operation of selecting is performed further based on a delay requirement, and the camping BWP is selected in such a way that a BWP having a first slot duration is prioritized over a BWP having a second slot duration longer than the first slot duration.

In an embodiment, the memory 1230 can further contain instructions executable by the processor 1220 whereby the terminal device 1200 is operative to: receive, from a network device, an instruction to camp on another BWP; and camp on the other BWP in response to the instruction.

In an embodiment, the memory 1230 can further contain instructions executable by the processor 1220 whereby the terminal device 1200 is operative to: receive, from a network device, an indication of load levels of one or more random access capable BWPs in the carrier; reselect one of the one or more random access capable BWPs to camp on based on the load levels.

In an embodiment, the memory 1230 can further contain instructions executable by the processor 1220 whereby the terminal device 1200 is operative to: receive, from a network device, an indication of BWP-specific offsets of one or more random access capable BWPs in the carrier; reselect one of the one or more random access capable BWPs to camp on while applying the BWP-specific offsets to signal power thresholds of the respective one or more random access capable BWPs.

In an embodiment, the terminal device is in an idle or inactive state.

Alternatively, the memory 1230 can contain instructions executable by the processor 1220 whereby the terminal device 1200 is operative to perform the actions, e.g., of the procedure described earlier in conjunction with FIG. 3. Particularly, the memory 1230 contains instructions executable by the processor 1220 whereby the terminal device 1200 is operative to: search a carrier for a random access capable BWP; and camp on the random access capable BWP. The searching is randomized in such a way that the carrier is searched with a random start position and/or a random direction.

In an embodiment, the operation of searching includes: selecting a searching scheme randomly from a plurality of predefined searching schemes having respectively different start positions and/or random directions.

In an embodiment, the memory 1230 can further contain instructions executable by the processor 1220 whereby the terminal device 1200 is operative to: receive, from a network device, an instruction to camp on another BWP; and camp on the other BWP in response to the instruction.

In an embodiment, the memory 1230 can further contain instructions executable by the processor 1220 whereby the terminal device 1200 is operative to: receive, from a network device, an indication of load levels of one or more random access capable BWPs in the carrier; reselect one of the one or more random access capable BWPs to camp on based on the load levels.

In an embodiment, the memory 1230 can further contain instructions executable by the processor 1220 whereby the terminal device 1200 is operative to: receive, from a network device, an indication of BWP-specific offsets of one or more random access capable BWPs in the carrier; reselect one of the one or more random access capable BWPs to camp on while applying the BWP-specific offsets to signal power thresholds of the respective one or more random access capable BWPs.

In an embodiment, the terminal device is in an idle or inactive state.

Alternatively, the memory 1230 can contain instructions executable by the processor 1220 whereby the terminal device 1200 is operative to perform the actions, e.g., of the procedure described earlier in conjunction with FIG. 4. The terminal device is in an active state and camping on a BWP in a carrier.

Particularly, the memory 1230 contains instructions executable by the processor 1220 whereby the terminal device 1200 is operative to: receive, from a network device, an instruction to camp on another BWP; and camping on the other BWP in response to the instruction.

In an embodiment, the instruction is received when the terminal device is to transition to an idle or inactive state.

Figure 13:
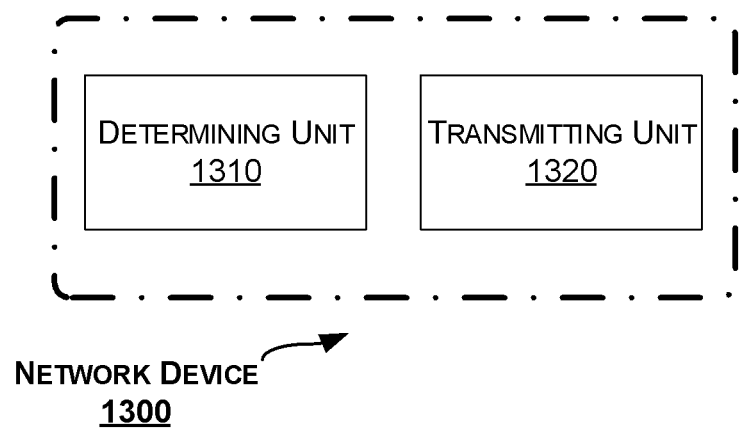
FIG. 13 is a block diagram of a network device according to an embodiment of the present disclosure.

Correspondingly to the methods 500, 600, 700 and 800 as described above, a network device is provided. FIG. 13 is a block diagram of a network device 1300 according to an embodiment of the present disclosure.

As shown in FIG. 13, the network device 1300 includes a determining unit 1310 configured to determine a set of random access capable BWPs in the carrier. The network device 1300 further includes a transmitting unit 1320 configured to transmit information on the set of random access capable BWPs via a system broadcast.

In an embodiment, the terminal device is in an idle or inactive state.

Alternatively, the determining unit 1310 can be configured to determine to reallocate a terminal device camping on a BWP in the carrier to another BWP. The transmitting unit 1320 can be configured to transmit to the terminal device an instruction to camp on the other BWP.

In an embodiment, the other BWP has the lowest load level among random access capable BWPs in the carrier.

In an embodiment, the terminal device is in an idle or inactive state.

Alternatively, the determining unit 1310 can be configured to determine information facilitating BWP reselection at a terminal device. The transmitting unit 1320 can be configured to transmit the information to the terminal device.

In an embodiment, the information includes an indication of load levels of one or more random access capable BWPs in the carrier.

In an embodiment, the information includes an indication of BWP-specific offsets of one or more random access capable BWPs in the carrier, for use by the terminal device to apply to signal power thresholds of the respective one or more random access capable BWPs in the BWP reselection.

In an embodiment, the terminal device is in an idle or inactive state.

Alternatively, the determining unit 1310 can be configured to determine to reallocate a terminal device being in an active state and camping on a BWP in the carrier to another BWP. The transmitting unit 1320 can be configured to transmitting to the terminal device an instruction to camp on the other BWP.

In an embodiment, the instruction is transmitted when the terminal device is to transition to an idle or inactive state.

Figure 14:
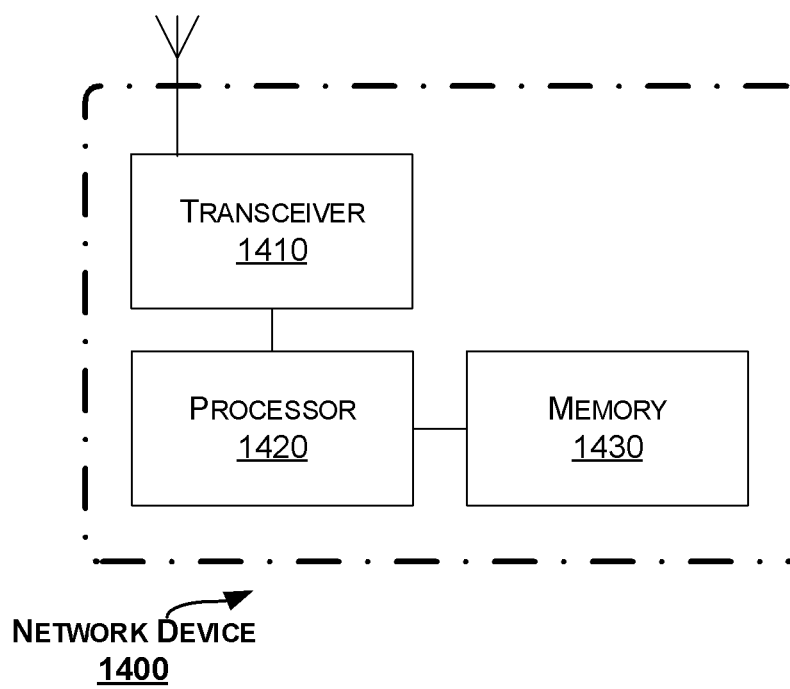
FIG. 14 is a block diagram of a network device according to another embodiment of the present disclosure.

FIG. 14 is a block diagram of a network device 1400 according to a further embodiment of the present disclosure.

The network device 1400 includes a transceiver 1410, a processor 1420 and a memory 1430. The memory 1430 can contain instructions executable by the processor 1420 whereby the network device 1400 is operative to perform the actions, e.g., of the procedure described earlier in conjunction with FIG. 5, 6, 7 or 8.

Particularly, the memory 1430 can contain instructions executable by the processor 1420 whereby the network device 1400 is operative to: determine a set of random access capable BWPs in the carrier; and transmit information on the set of random access capable BWPs via a system broadcast.

In an embodiment, the terminal device is in an idle or inactive state.

Alternatively, the memory 1430 can contain instructions executable by the processor 1420 whereby the network device 1400 is operative to: determine to reallocate a terminal device camping on a BWP in the carrier to another BWP; and transmit to the terminal device an instruction to camp on the other BWP.

In an embodiment, the other BWP has the lowest load level among random access capable BWPs in the carrier.

In an embodiment, the terminal device is in an idle or inactive state.

Alternatively, the memory 1430 can contain instructions executable by the processor 1420 whereby the network device 1400 is operative to: determine information facilitating BWP reselection at a terminal device; and transmit the information to the terminal device.

In an embodiment, the information includes an indication of load levels of one or more random access capable BWPs in the carrier.

In an embodiment, the information includes an indication of BWP-specific offsets of one or more random access capable BWPs in the carrier, for use by the terminal device to apply to signal power thresholds of the respective one or more random access capable BWPs in the BWP reselection.

In an embodiment, the terminal device is in an idle or inactive state.

Alternatively, the memory 1430 can contain instructions executable by the processor 1420 whereby the network device 1400 is operative to: determine to reallocate a terminal device being in an active state and camping on a BWP in the carrier to another BWP; and transmit to the terminal device an instruction to camp on the other BWP.

In an embodiment, the instruction is transmitted when the terminal device is to transition to an idle or inactive state.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1220 causes the terminal device 1200 to perform the actions, e.g., of the procedure described earlier in conjunction with FIG. 2, 3 or 4; or code/computer readable instructions, which when executed by the processor 1420 causes the network device 1400 to perform the actions, e.g., of the procedure described earlier in conjunction with FIG. 5, 6, 7 or 8.

The computer program product may be configured as a computer program code structured in computer program modules. The computer program modules could essentially perform the actions of the flow illustrated in FIG. 2, 3, 4, 5, 6, 7 or 8.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 15:
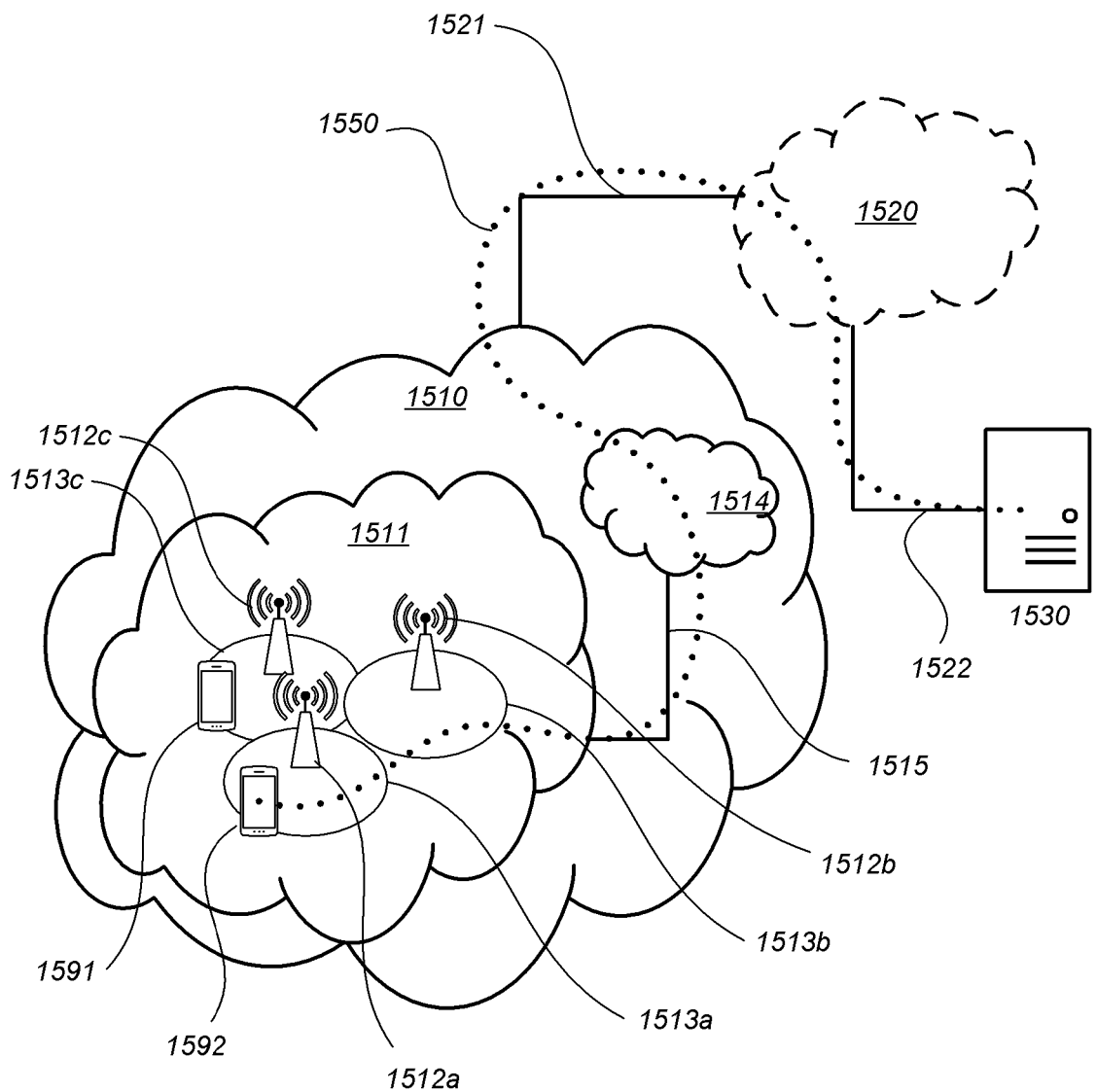
FIG. 15 schematically illustrates a telecommunication network connected via an intermediate network to a host computer.

With reference to FIG. 15, in accordance with an embodiment, a communication system includes a telecommunication network 1510, such as a 3GPP-type cellular network, which comprises an access network 1511, such as a radio access network, and a core network 1514. The access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to the core network 1514 over a wired or wireless connection 1515. A first user equipment (UE) 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server or as processing resources in a server farm. The host computer 1530 may be under the ownership or control of a service provider, or may be operated by the service provider or on behalf of the service provider. The connections 1521, 1522 between the telecommunication network 1510 and the host computer 1530 may extend directly from the core network 1514 to the host computer 1530 or may go via an optional intermediate network 1520. The intermediate network 1520 may be one of, or a combination of more than one of, a public, private or hosted network; the intermediate network 1520, if any, may be a backbone network or the Internet; in particular, the intermediate network 1520 may comprise two or more sub-networks (not shown).

The communication system of FIG. 15 as a whole enables connectivity between one of the connected UEs 1591, 1592 and the host computer 1530. The connectivity may be described as an over-the-top (OTT) connection 1550. The host computer 1530 and the connected UEs 1591, 1592 are configured to communicate data and/or signaling via the OTT connection 1550, using the access network 1511, the core network 1514, any intermediate network 1520 and possible further infrastructure (not shown) as intermediaries. The OTT connection 1550 may be transparent in the sense that the participating communication devices through which the OTT connection 1550 passes are unaware of routing of uplink and downlink communications. For example, a base station 1512 may not or need not be informed about the past routing of an incoming downlink communication with data originating from a host computer 1530 to be forwarded (e.g., handed over) to a connected UE 1591. Similarly, the base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, application-specific integrated circuits, field programmable gate arrays or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with a UE 1630 located in a coverage area (not shown in FIG. 16) served by the base station 1620.

The communication interface 1626 may be configured to facilitate a connection 1660 to the host computer 1610. The connection 1660 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, application-specific integrated circuits, field programmable gate arrays or combinations of these (not shown) adapted to execute instructions. The base station 1620 further has software 1621 stored internally or accessible via an external connection.

The communication system 1600 further includes the UE 1630 already referred to. Its hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, application-specific integrated circuits, field programmable gate arrays or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, an executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

Figure 16:
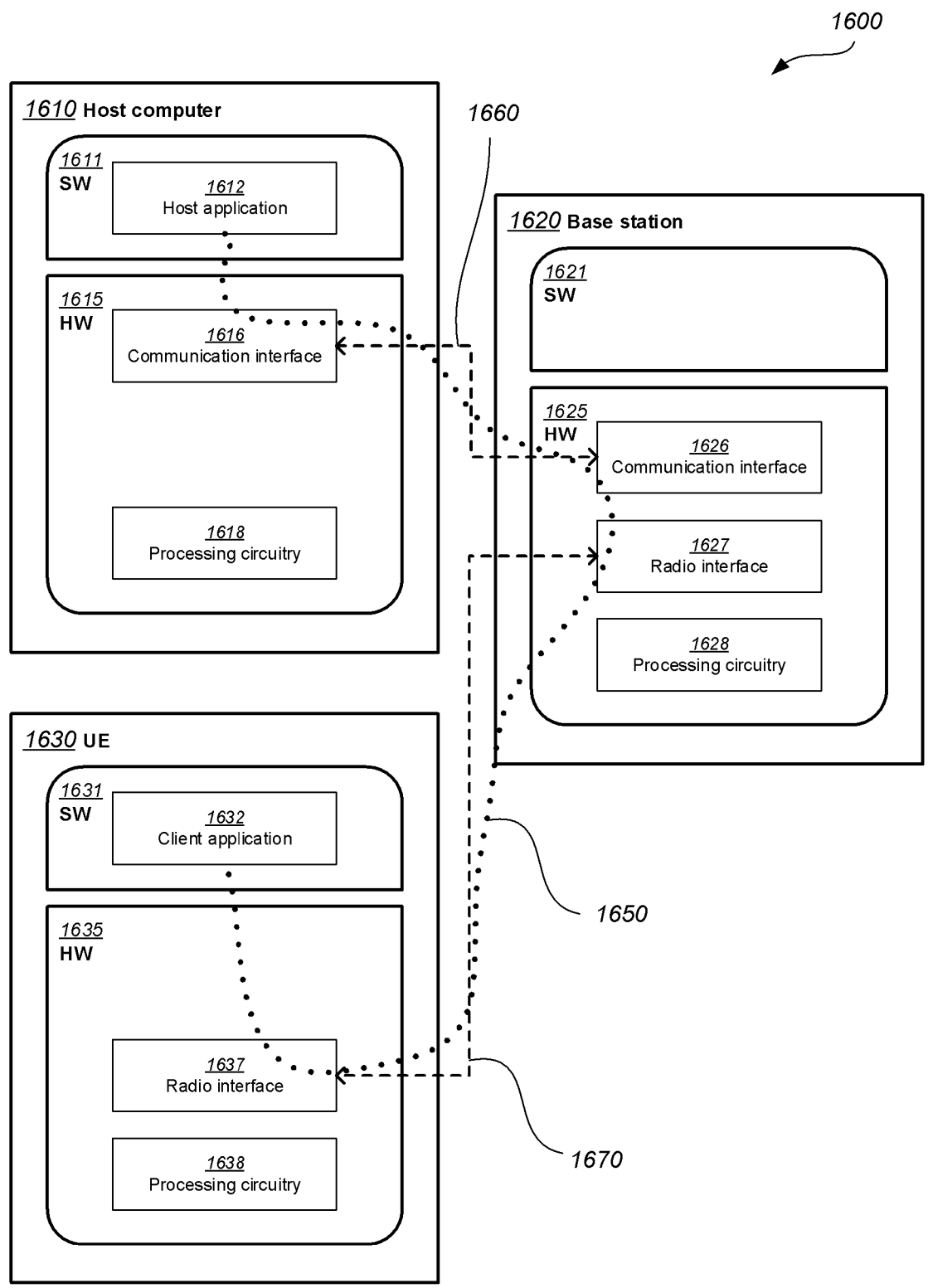
FIG. 16 is a generalized block diagram of a host computer communicating via a base station with a user equipment over a partially wireless connection.

It is noted that the host computer 1610, base station 1620 and UE 1630 illustrated in FIG. 16 may be identical to the host computer 1530, one of the base stations 1512a, 1512b, 1512c and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the use equipment 1630 via the base station 1620, without explicit reference to any intermediary devices and the precise routing of messages via these devices. Network infrastructure may determine the routing, which it may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may improve the data rate, latency and power consumption] and thereby provide benefits such as reduced user waiting time, and extended battery lifetime.

A measurement procedure may be provided for the purpose of monitoring data rate, latency and other factors on which the one or more embodiments improve. There may further be an optional network functionality for reconfiguring the OTT connection 1650 between the host computer 1610 and UE 1630, in response to variations in the measurement results. The measurement procedure and/or the network functionality for reconfiguring the OTT connection 1650 may be implemented in the software 1611 of the host computer 1610 or in the software 1631 of the UE 1630, or both. In embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of the OTT connection 1650 may include message format, retransmission settings, preferred routing etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer's 1610 measurements of throughput, propagation times, latency and the like. The measurements may be implemented in that the software 1611, 1631 causes messages to be transmitted, in particular empty or 'dummy' messages, using the OTT connection 1650 while it monitors propagation times, errors etc.

Figures 17, 18:
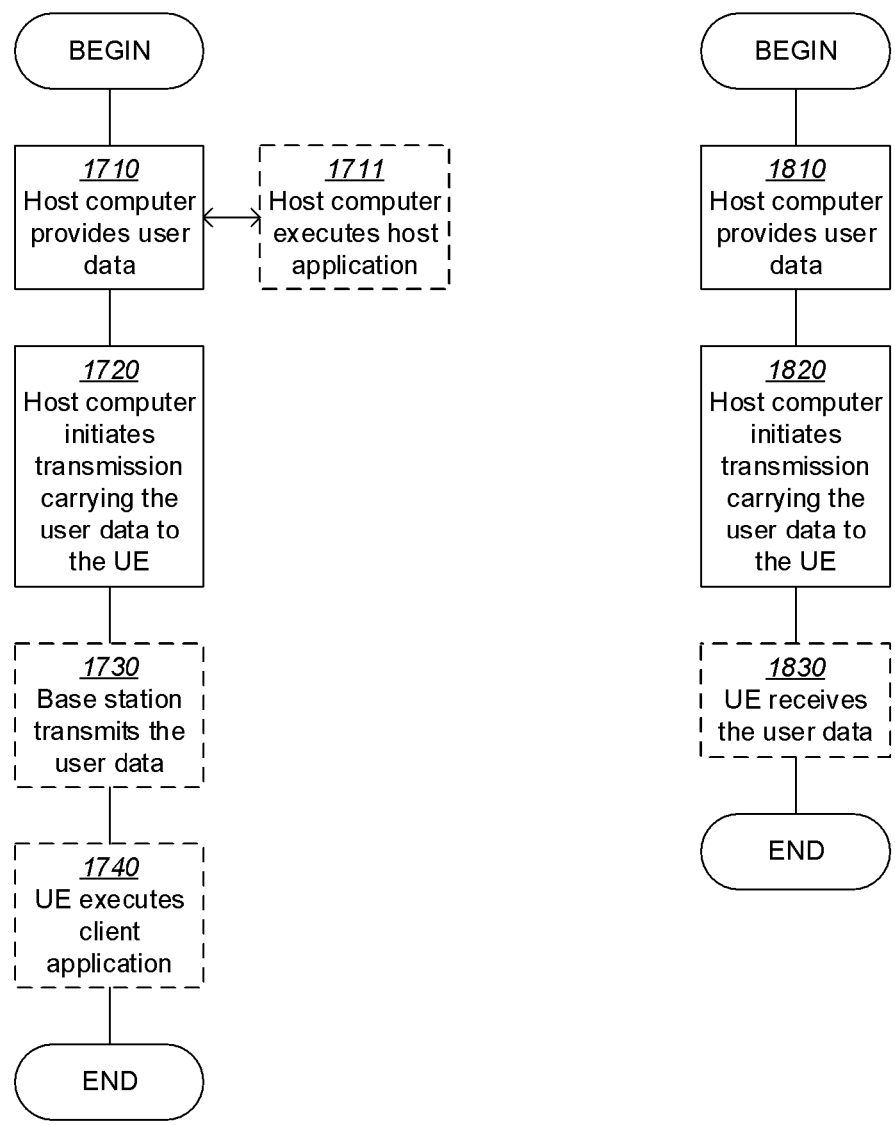

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 1710 of the method, the host computer provides user data. In an optional substep 1711 of the first step 1710, the host computer provides the user data by executing a host application. In a second step 1720, the host computer initiates a transmission carrying the user data to the UE. In an optional third step 1730, the base station transmits to the UE the user data which was carried in the transmission that the host computer initiated, in accordance with the teachings of the embodiments described throughout this disclosure. In an optional fourth step 1740, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 1810 of the method, the host computer provides user data. In an optional substep (not shown) the host computer provides the user data by executing a host application. In a second step 1820, the host computer initiates a transmission carrying the user data to the UE. The transmission may pass via the base station, in accordance with the teachings of the embodiments described throughout this disclosure. In an optional third step 1830, the UE receives the user data carried in the transmission.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 1910 of the method, the UE receives input data provided by the host computer. Additionally or alternatively, in an optional second step 1920, the UE provides user data. In an optional substep 1921 of the second step 1920, the UE provides the user data by executing a client application. In a further optional substep 1911 of the first step 1910, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1930, transmission of the user data to the host computer. In a fourth step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 2010 of the method, in accordance with the teachings of the embodiments described throughout this disclosure, the base station receives user data from the UE. In an optional second step 2020, the base station initiates transmission of the received user data to the host computer. In a third step 2030, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device for load balancing across random access capable Band-Width Parts (BWPs) in a carrier, comprising:
   the terminal device randomly selecting a random access capable BWP within the carrier; and
   the terminal device, after selecting the random access capable BWP, initiating a random access process in the randomly selected random access capable BWP to establish a connection with a radio access network node.

2. The method of claim 1, wherein
   the carrier comprises a set of random access capable BWPs,
   the method further comprises, prior to randomly selecting the random access capable BWP, the terminal device determining the set of random access capable BWPs, and
   the determining comprises: receiving information on the set of random access capable BWPs via a system broadcast.

3. The method of claim 1, wherein
   the carrier comprises a set of random access capable BWPs, the method further comprises, prior to randomly selecting the random access capable BWP, the terminal device determining the set of random access capable BWPs, and the determining comprises: searching an entire bandwidth of the carrier for the set of random access capable BWPs.

4. The method of claim 1, wherein the randomly selecting comprises: randomly selecting the BWP based on an Area-Radio Network Temporary Identifier, an International Mobile Subscriber Identification, or a Service Architecture Evolution—Temporary Mobile Subscriber Identity.

5. The method of claim 1, wherein a BWP having a first radio quality is prioritized over a BWP having a second radio quality lower than the first radio quality.

6. The method of claim 1, wherein a BWP having a first slot duration is prioritized over a BWP having a second slot duration shorter than the first slot duration.

7. The method of claim 1, wherein a BWP having a first slot duration is prioritized over a BWP having a second slot duration longer than the first slot duration.

8. A method in a network device for load balancing across Band-Width Parts (BWPs) in a carrier, comprising:

determining a set of random access capable BWPs in the carrier, wherein the set of random access capable BWPs comprises a first random access capable BWP and a second random access capable BWP; and transmitting information on the set of random access capable BWPs via a system broadcast, wherein the information on the set of random access capable BWPs comprises:

first information identifying a time-frequency resource within the first random access capable BWP for a first System Information Broadcast Type 1 (SIB1) transmission, and second information identifying a time-frequency resource within the second random access capable BWP for a second SIB transmission.

9. A network device comprising a transceiver, a processor and a memory, the memory comprising instructions executable by the processor whereby the network device is operative to perform the method of claim 8.

10. The method of claim 1, wherein the carrier comprises a set of random access capable BWPs, wherein the set of random access capable BWPs comprises a first random access capable BWP and a second random access capable BWP, the method further comprises, prior to randomly selecting the random access capable BWP, the terminal device determining the set of random access capable BWPs, and determining the set of random access capable BWPs comprises receiving a system broadcast comprising information on the set of random access capable BWPs, wherein the information on the set of random access capable BWPs comprises:

first information identifying a time-frequency resource within the first random access capable BWP for a first System Information Broadcast Type 1 (SIB1) transmission, and second information identifying a time-frequency resource within the second random access capable BWP for a second SIB transmission.

11. The method of claim 1, wherein the carrier has a bandwidth, and randomly selecting a random access capable BWP comprises:

randomly selecting a frequency within the carrier bandwidth; and after randomly selecting the frequency, searching the carrier bandwidth for a random access capable BPW, wherein the searching starts at the randomly selected frequency.

\* \* \* \* \*